Patented Nov. 25, 1952

2,619,487

UNITED STATES PATENT OFFICE 2,619,487

CHLOROMETHYL DERIVATIVES OF PYRAZOLEANTHRONE-BENZANTHRONES

David Irwin Randall, Easton, Pa., assignor to General Aniline & Film Corporation, New York, N. Y., a corporation of Delaware No Drawing. Original application March 8, 1949, Serial No. 80,313. Divided and this application November 9, 1950, Serial No. 194,931

3 Claims. (Cl. 260—275)

The present invention relates to chloromethylated pyrazoleanthrone-benzanthrones.

There is available on the market a product of the following structure:

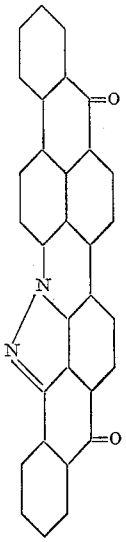

which is herein called Dyestuff A. This product may be obtained by condensing pyrazoleanthrone with 4-bromobenzanthrone and ring closing the resulting condensation product.

This product has one deficiency and that is the tendency to undergo a very undesirable reddening when moistened with water, i. e., it is very susceptible to water spotting. Because of this deficiency, the use of the product has been greatly limited as a commercial dyestuff even though its other fastness properties are excellent.

Efforts have been made to improve the water spotting fastness of the involved compound by converting it into its di-bromo and di-chloro derivatives. Some improvement in the water spotting fastness is realized in this way and the di-halo derivatives also have the advantage that the introduction of the halogen atoms changes the shade to a more desirable blue. However, even the di-halo derivatives do not meet the requirements of the dyestuff art insofar as the water spotting fastness is concerned.

I have now discovered that products fast to water spotting and partaking of the other excellent fastness properties of Dyestuff A are obtained by introducing into Dyestuff A one or two chlormethyl groups. The improvement is particularly outstanding in the case of the di-chlormethyl derivative which also exhibits surprising greenish-blue shades.

Chlormethyl derivatives of Dyestuff A and the preparation thereof constitute the purposes and objects of the present invention.

The compounds contemplated herein may be represented by the following structure:

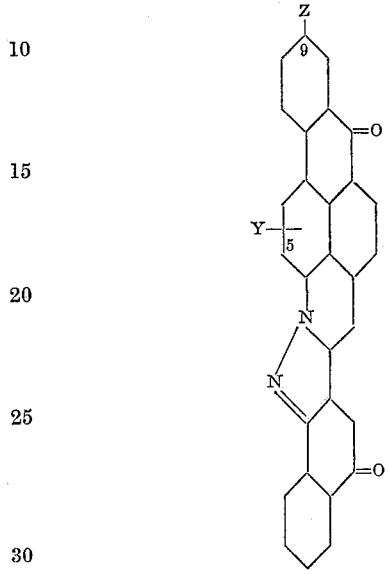

in which Y is chlormethyl and Z is hydrogen or chlormethyl.

The particular position occupied by substituent Y has not been definitely ascertained. It appears, however, that this substituent enters the 5-position but since this has not been established, it is preferred to indicate the position of Y in the above manner.

The compounds involved may be made by different procedures. For instance, compounds in which Y is chlormethyl and Z is hydrogen are obtained by the treatment of Dyestuff A with dichloro dimethyl ether in concentrated sulfuric acid or sulfuric acid monohydrate at room temperature. By elevating the temperature to 50–70° C., the di-chlormethyl derivatives, i. e., in which Z and Y are both chlormethyl, are obtained.

The monochlormethyl and di-chlormethyl derivatives may be converted to the monomethyl and dimethyl derivatives, respectively, by vatting the dyestuffs according to the usual procedure.

Examples of the compounds contemplated herein are:

x-chlormethyl pyrazoleanthrone-benzanthrone and x-9-(dichloromethyl)-
pyrazoleanthrone-benzanthrone In connection with the chlormethylation outlined above, it is of importance to note that most aromatic amines are difficult or almost impossible to chlormethylate in this way. It appears that the compounds involved are amenable to chlormethylation by reason of the presence of the pyrazole ring which seems to stabilize the molecule sufficiently to allow the reaction to proceed.

The invention is further illustrated by the following examples, but it is to be understood that the invention is not restricted thereto.

Example I 17.0 grams of Dyestuff A were dissolved in 76 cc. of 96% sulfuric acid. At 25° C., 20 cc. of dichlorodimethyl ether are added. The temperature was held at 60° C. for 15 hours. After pouring into ice and water, the bluish gray solid which precipitated was filtered off and washed neutral and dried. Weight 20.4 grams, chlorine calculated 12.9%, found 10.8%.

The product has the following probable formula:

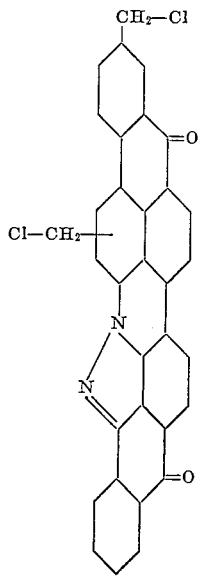

Dyeings of this compound showed a greenish-blue shade fast to water spotting and of excellent fastness properties in general.

Example II

The chloromethylation of Example I was performed with the same reactants but at a temperature of 25° C. At this temperature, only one chloromethyl group is introduced.

Example III 4-(pyrazoleanthranyl)-benzanthrone was chloromethylated as in Example I. Two chloromethyl groups were thus introduced, one in the 9-position and the other apparently in the 5-position. The starting material was prepared by condensing 4-bromobenzanthrone with pyrazoleanthrone in the presence of powdered calcined potassium carbonate and nitrobenzene at a temperature of 205° C.

This application is a division of my copending application Serial No. 80,313 filed March 8, 1949.

I claim:

1. A compound selected from the class consisting of those of the following formula

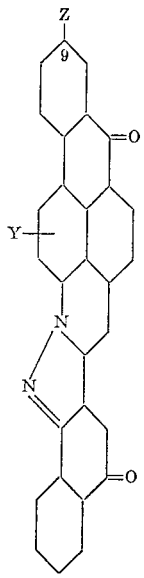

in which Y is chloromethyl and Z is selected from the class consisting of hydrogen and chloromethyl.

2. A compound of the following formula

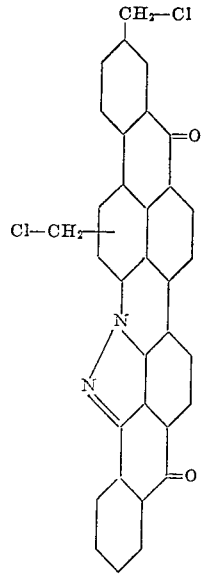

3. The compound of claim 1 wherein Z is hydrogen.

DAVID IRWIN RANDALL.

No references cited.